US012803145B2

(12) United States Patent
Sato et al.

(10) Patent No.: US 12,803,145 B2
(45) Date of Patent: Nov. 17, 2026

(54) NON-RECIPROCAL CIRCUIT ELEMENT

(71) Applicant: TDK Corporation, Tokyo (JP)

(72) Inventors: Yoshiaki Sato, Tokyo (JP); Katsuyuki Nakada, Tokyo (JP); Atsushi Ajioka, Tokyo (JP); Hidenori Ohata, Tokyo (JP); Tomoyuki Sasaki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 36 days.

(21) Appl. No.: 18/871,888

(22) PCT Filed: Jun. 9, 2022

(86) PCT No.: PCT/JP2022/023240
§ 371 (c)(1),
(2) Date: Dec. 5, 2024

(87) PCT Pub. No.: WO2023/238310
PCT Pub. Date: Dec. 14, 2023

(65) Prior Publication Data

US 2025/0357653 A1 Nov. 20, 2025

(51) Int. Cl.
*H01P 1/36* (2006.01)
*H01P 1/32* (2006.01)
*H01P 1/387* (2006.01)

(52) U.S. Cl.
CPC .................. *H01P 1/32* (2013.01); *H01P 1/36* (2013.01); *H01P 1/387* (2013.01)

(58) Field of Classification Search
CPC .. H01P 1/38; H01P 1/383; H01P 1/387; H01P 1/36; H01P 1/32
USPC .................................................. 333/24.2, 1.1
See application file for complete search history.

(56) References Cited

U.S. PATENT DOCUMENTS

2003/0231076 A1* 12/2003 Takeuchi .................. H01P 1/32 333/1.1
2004/0119552 A1* 6/2004 Wray ........................ H01P 1/26 333/22 R
2019/0131683 A1 5/2019 Abdo

FOREIGN PATENT DOCUMENTS

JP H04-287403 A 10/1992
JP 6998459 B2 1/2022

OTHER PUBLICATIONS

Aug. 30, 2022 International Search Report issued in International Patent Application No. PCT/JP2022/023240.

* cited by examiner

*Primary Examiner* — Andrea Lindgren Baltzell
*Assistant Examiner* — Abigail Amir Yaldo
(74) *Attorney, Agent, or Firm* — Oliff PLC

(57) ABSTRACT

A non-reciprocal circuit element includes a metal layer, a loss layer, and magnet. The metal layer includes a first terminal, a second terminal, and a third terminal. The loss layer includes a magnetic material and an absorber. The magnetic material overlaps a first region of the metal layer in a thickness direction. The absorber overlaps a second region of the metal layer in the thickness direction. The magnet and the metal layer sandwich at least the magnetic material in the thickness direction. When viewed from the thickness direction, a minimum width between a first side of the metal layer connecting the first and second terminals and a second side of the absorber on a side of the first and second terminals is smaller than a width between a first straight line connecting both ends of the first side and a second straight line connecting both ends of the second side.

9 Claims, 10 Drawing Sheets

NON-RECIPROCAL CIRCUIT ELEMENT

TECHNICAL FIELD

The present invention relates to a non-reciprocal circuit element.

BACKGROUND ART

A non-reciprocal circuit element is an element that defines a transmission direction of a high-frequency signal. An isolator and a circulator are examples of the non-reciprocal circuit element. A non-reciprocal circuit element is widely used in circuits through which a high-frequency signal is transmitted.

A non-reciprocal circuit element is used in various applications in which high-frequency signals are used. For example, Patent Document 1 discloses an isolator for microwave communication. Also, for example, Patent Document 2 describes use of an isolator in a quantum computer.

CITATION LIST

Patent Document

Patent Document 1: Japanese Unexamined Patent Application, First Publication No. H4-287403

Patent Document 2: Japanese Patent No. 6998459

SUMMARY OF INVENTION

Technical Problem

There is a problem that isolation characteristics of an isolator deteriorate as a frequency of an input signal becomes higher.

The present invention has been made in view of the above circumstances, and an objective of the present invention is to provide a non-reciprocal circuit element in which isolation characteristics are less likely to deteriorate even when a high-frequency input signal is input.

Solution to Problem

In order to solve the above-described problems, the present invention provides the following means.

(1) Anon-reciprocal circuit element according to the present embodiment includes a metal layer, a loss layer, and a magnet. The metal layer includes a first terminal, a second terminal, and a third terminal. The loss layer includes a magnetic material and an absorber. The magnetic material overlaps a first region of the metal layer in a thickness direction. The absorber overlaps a second region of the metal layer in the thickness direction. The first region extends across the first terminal and the second terminal. The second region extends between the first terminal and the third terminal and between the second terminal and the third terminal. The magnet and the metal layer sandwich at least the magnetic material in the thickness direction. When viewed from the thickness direction, a minimum width between a first side of the metal layer connecting the first terminal and the second terminal and a second side of the absorber on a side of the first terminal and the second terminal is smaller than a width between a first straight line connecting both ends of the first side and a second straight line connecting both ends of the second side.

(2) In the non-reciprocal circuit element according to the above-described aspect, a width between the first side and the second side may be minimum at a midpoint of the first side.

(3) In the non-reciprocal circuit element according to the above-described aspect, the first side may be bent or curved toward the second straight line.

(4) In the non-reciprocal circuit element according to the above-described aspect, the second side may be bent or curved toward the first straight line.

(5) In the non-reciprocal circuit element according to the above-described aspect, the first side may be bent or curved toward the second straight line, and the second side may be bent or curved toward the first straight line.

(6) In the non-reciprocal circuit element according to the above-described aspect, the minimum width may satisfy the following expression (1). In expression (1), W1 is the minimum width, $f_0$ is a maximum frequency of an input signal input to the first terminal or the second terminal, $\varepsilon_0$ is a dielectric constant of a vacuum, $\mu_0$ is a permeability of a vacuum, $\varepsilon_{eff}$ is an effective dielectric constant of the magnetic material at the frequency $f_0$, and $\mu_{eff}$ is an effective permeability of the magnetic material at the frequency $f_0$ when a DC magnetic field is applied from the magnet to the magnetic material.

[Math. 1]

$$W1 \leq \frac{1}{2f_0\sqrt{\varepsilon_0\mu_0\varepsilon_{eff}\mu_{eff}}} \quad (1)$$

(7) In the non-reciprocal circuit element according to the above-described aspect, the third terminal may be grounded directly or via a resistor.

Advantageous Effects of Invention

The non-reciprocal circuit element according to the present invention is less likely to deteriorate in isolation characteristics even when a high-frequency input signal is input.

DESCRIPTION OF EMBODIMENTS

Figure 1:
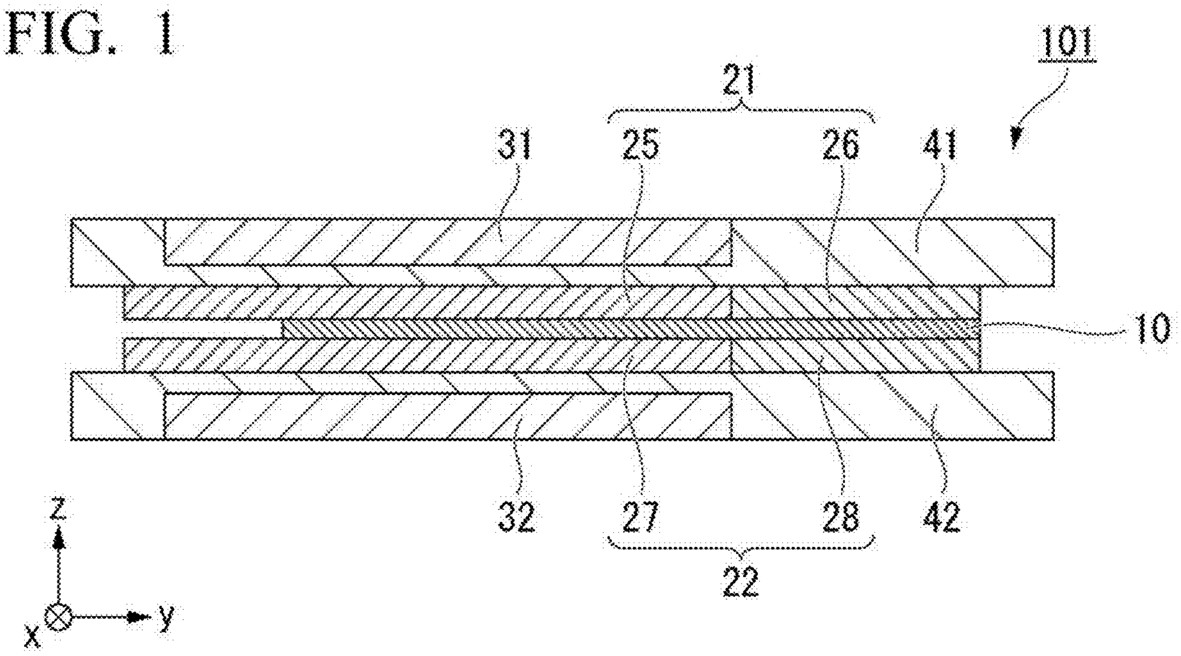
FIG. 1 A cross-sectional view of a non-reciprocal circuit element according to a first embodiment.

Hereinafter, the present embodiment will be described in detail with reference to the drawings as appropriate. In the drawings used in the following description, there are cases in which characteristic portions are enlarged for convenience of illustration so that characteristics can be easily understood, and dimensional proportions of respective constituent elements may be different from actual ones. Materials, dimensions, and the like illustrated in the following description are merely examples, and the present invention is not limited thereto and can be implemented with appropriate modifications within a range in which the effects of the present invention are achieved.

First, directions will be defined. One direction of a surface along which a metal layer extends is defined as an x direction. For example, a direction connecting a first terminal and a second terminal of the metal layer is defined as the x direction. Also, a direction orthogonal to the x direction on the surface in which the metal layer extends is defined as a y direction. A direction orthogonal to the x direction and the y direction is defined as a z direction. A thickness direction of each layer is an example of the z direction.

First Embodiment

FIG. 1 is a cross-sectional view of a non-reciprocal circuit element 101 according to a first embodiment. The non-reciprocal circuit element 101 includes, for example, a metal layer 10, a first loss layer 21, a second loss layer 22, a first magnet 31, a second magnet 32, a first conductor 41, and a second conductor 42. The non-reciprocal circuit element 101 functions as, for example, an isolator.

Figure 2:
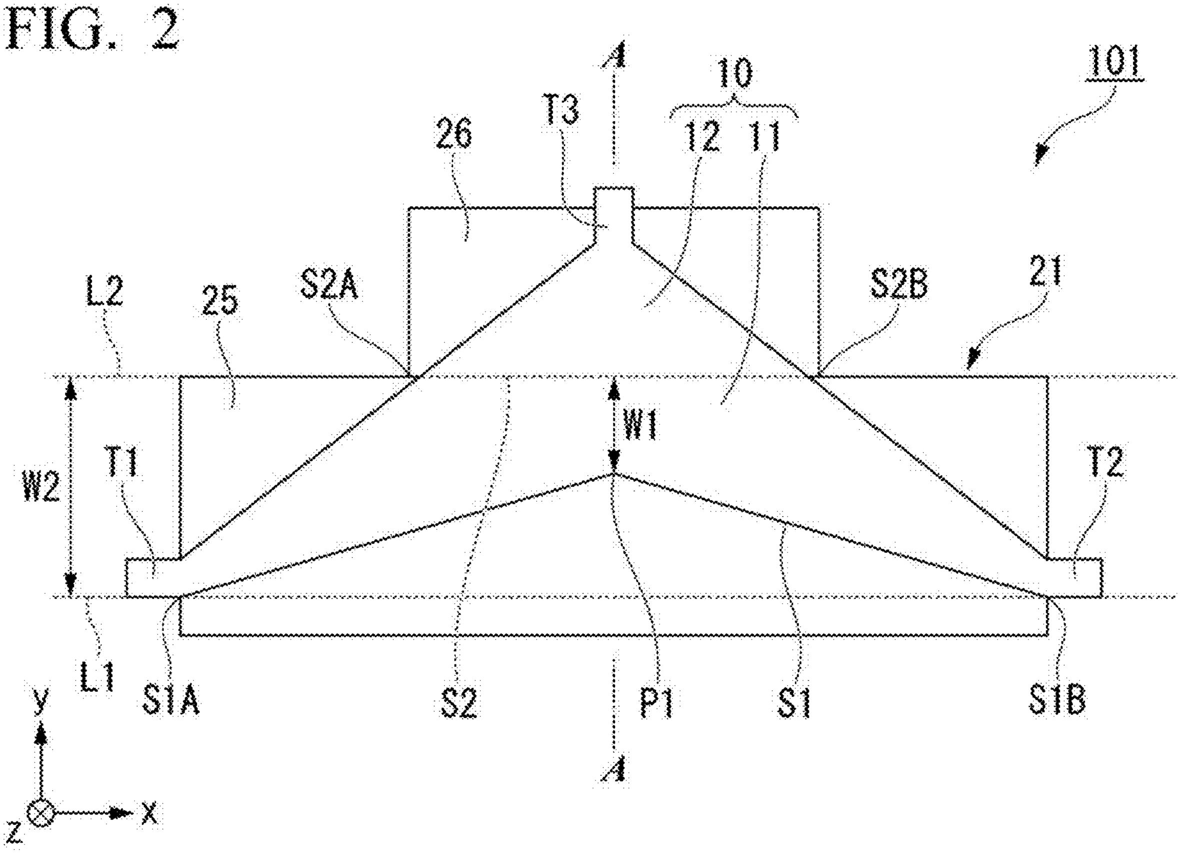
FIG. 2 A plan view of a metal layer and a loss layer of the non-reciprocal circuit element according to the first embodiment.
Figure 3:
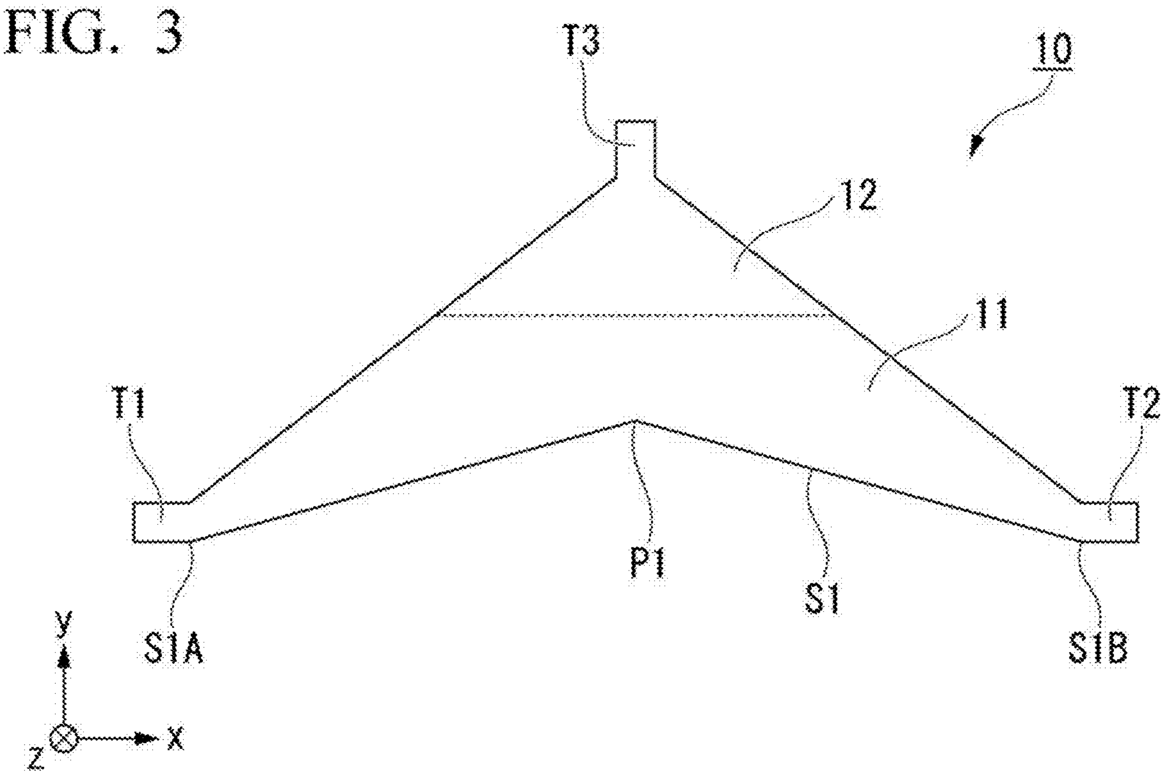
FIG. 3 A plan view of the metal layer of the non-reciprocal circuit element according to the first embodiment.
Figure 4:
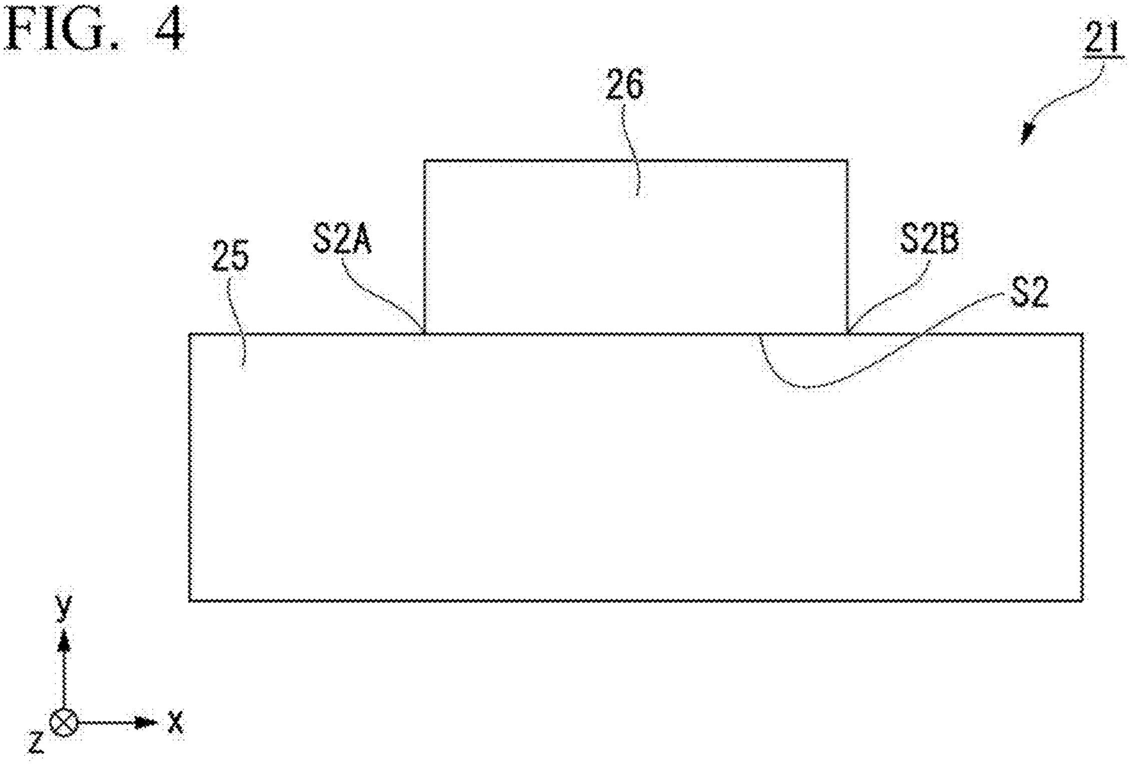
FIG. 4 A plan view of the loss layer of the non-reciprocal circuit element according to the first embodiment.

FIG. 2 is a plan view of the metal layer 10 and the first loss layer 21 of the non-reciprocal circuit element 101 according to the first embodiment. FIG. 1 is a cross section taken along line A-A of FIG. 2. FIG. 3 is a plan view of the metal layer 10 of the non-reciprocal circuit element 101 according to the first embodiment. FIG. 4 is a plan view of the first loss layer 21 of the non-reciprocal circuit element 101 according to the first embodiment.

The metal layer 10 has a first terminal T1, a second terminal T2, and a third terminal T3. The first terminal T1, the second terminal T2, and the third terminal T3 correspond to, for example, vertices of a triangle. The first terminal T1 and the second terminal T2 are connected to external terminals. The third terminal T3 is, for example, an open end.

The metal layer 10 transmits a high-frequency signal. The metal layer 10 transmits a high-frequency signal non-reciprocally between the first terminal T1 and the second terminal T2. "Transmitting a high-frequency signal non-reciprocally" means that a propagation efficiency of the signal differs depending on a direction. For example, if a signal is propagated with a low loss in a forward direction but is hardly propagated in a reverse direction, this corresponds to "transmitting a high-frequency signal non-reciprocally". A propagation direction of the high-frequency signal in the metal layer 10 is controlled by the first loss layer 21 and the second loss layer 22 to be described later.

Ahigh-frequency signal input from the first terminal T1 is transmitted to the second terminal T2 with a low loss. Ahigh-frequency signal input from the second terminal T2 is transmitted to the third terminal T3 with a low loss. A high-frequency signal input from the third terminal T3 is transmitted to the first terminal T1 with a low loss. A high-frequency signal input from the second terminal T2 reaches the first terminal T1 via the third terminal T3, but most of it is absorbed. That is, almost no high-frequency signal is transmitted from the second terminal T2 to the first terminal T1. That is, the high-frequency signal is transmitted with a low loss from the first terminal T1 to the second terminal T2, but is hardly transmitted from the second terminal T2 to the first terminal T.

The metal layer 10 is not particularly limited as long as it transmits a high-frequency signal with a high efficiency. The metal layer 10 is made of, for example, aluminum, copper, silver, gold, stainless steel, or the like. The metal layer 10 may also be a non-conductor or a high-resistance conductor (such as phosphor bronze) plated with aluminum, copper, silver, gold, stainless steel, or the like.

The metal layer 10 has a first region 11 and a second region 12. The first region 11 extends across the first terminal T1 and the second terminal T2. The first region 11 overlaps a first magnetic material 25 in the z direction. The second region 12 extends between the first terminal T1 and the third terminal T3 and between the second terminal T2 and the third terminal T3. The second region 12 overlaps a first absorber 26 in the z direction. In a plan view from the z direction, between the first terminal T1 and the third terminal T3, and between the second terminal T2 and the third terminal T3, there is a boundary between the first region 11 and the second region 12.

A first side 81 of the metal layer 10 connecting the first terminal T1 and the second terminal T2 is bent. The first side S1 is bent toward the third terminal T3 side from a first straight line L1. The first side S1 is bent toward a second straight line L2. The first straight line L1 is a straight line connecting a first end S1A and a second end SIB of the first side S1. The second straight line L2 is a straight line connecting a first end S2A and a second end S2B of a second side S2 to be described later.

The first loss layer 21 and the second loss layer 22 sandwich the metal layer 10 in the z direction. The first loss layer 21 includes the first magnetic material 25 and the first absorber 26. The second loss layer 22 includes a second magnetic material 27 and a second absorber 28. The first loss layer 21 and the second loss layer 22 have substantially the same shape. The first loss layer 21 is between the metal layer 10 and the first magnet 31. The second loss layer 22 is between the metal layer 10 and the second magnet 32.

The first magnetic material 25 and the first absorber 26 are positioned at different positions in an xy plane. The second magnetic material 27 and the second absorber 28 are positioned at different positions in an xy plane. The first magnetic material 25 and the second magnetic material 27 are at positions overlapping the first region 11 of the metal layer 10 in the z direction. The first absorber 26 and the second absorber 28 are at positions overlapping the second region 12 of the metal layer 10 in the z direction.

Shapes of the first magnetic material 25 and the second magnetic material 27 are not limited as long as they can cover the first region 11. Shapes of the first absorber 26 and the second absorber 28 are not limited as long as they can cover the second region 12.

When a DC magnetic field is applied to the first magnetic material 25 and the second magnetic material 27 by the first magnet 31 and the second magnet 32, a high-frequency signal passing through the metal layer 10 propagates with a deviation to one side in a traveling direction thereof. For example, a high-frequency signal input from the first terminal T1 propagates with a deviation to a side opposite to the third terminal T3 of the metal layer 10, and propagates with a low loss to the second terminal T2. On the other hand, a high-frequency signal input to the second terminal T2 propagates with a deviation to the third terminal T3 side of the metal layer 10 and propagates to the first terminal T1. At this time, the high-frequency signal input to the second terminal T2 is absorbed by the first absorber 26 and the second absorber 28, and is therefore significantly attenuated.

The first magnetic material 25 and the second magnetic material 27 contain a magnetic material. The first magnetic material 25 and the second magnetic material 27 may be a conductor or may be an insulator. The first magnetic material 25 and the second magnetic material 27 contain, for example, a soft magnetic material. The first magnetic material 25 and the second magnetic material 27 contain any one selected from the group consisting of, for example, Co-based amorphous, ferrite, $Fe_{85}Si_2B_8P_4Cu$, $Fe_{86}AlB_8P_4Cu$, $Fe_{78}Si_9B_{13}$, and yttrium iron garnet (YIG). YIG is, for example, $Y_3Fe_2(FeO_4)_3$ or $Y_3Fe_5O_{12}$.

The first magnetic material 25 and the second magnetic material 27 may also be a mixture of magnetic particles and a resin. The magnetic particles include, for example, iron, silicon steel (Fe—Si), Permalloy (Ni—Fe), Permendur (Fe—Co), Sendust (Fe—Si—Al), electromagnetic stainless steel, amorphous iron-based alloys (Fe—B—C based, Fe—Co based), manganese zinc ferrite, nickel zinc ferrite, and the like. The first magnetic material 25 and the second magnetic material 27 may also be a mixture of ferrite particles and a resin.

When the magnetic material is dispersed in an insulating material (for example, a resin, rubber, a paint, or the like), a volume ratio of the magnetic material is preferably 10% or more and 70% or less. If the volume ratio of the magnetic material is low, an electromagnetic wave absorption capacity decreases. If the volume ratio of the magnetic material is high, it becomes difficult to be dispersed into the insulating material.

The first absorber 26 and the second absorber 28 contain a material having a higher magnetic loss rate than the first magnetic material 25 and the second magnetic material 27. The first absorber 26 and the second absorber 28 contain, for example, any one selected from the group consisting of, for example, iron, BN (boron nitride), conductive carbon, SiC, and Ni-based ferrite.

The second side S2 of the first absorber 26 is a straight line. The second side S2 is a side of the first absorber 26 on a side of the first terminal T1 and the second terminal T2. The second side S2 intersects a line extending in the y direction through the third terminal T3.

A width between the first side S1 and the second side S2 has, for example, a minimum width W1 at a midpoint P1 of the first side S1. The midpoint P1 is a center of the first side S1 in the x direction. Here, an example in which the minimum width W1 is at the midpoint P1 is illustrated, but the minimum width W1 may be at a position other than the midpoint P1.

The minimum width W1 is smaller than a width W2 between the first straight line L1 and the second straight line L2. Although details will be described later, if the minimum width W1 is smaller than the width W2, a cutoff frequency shifts to a higher frequency side, and isolation characteristics are less likely to deteriorate even when a high-frequency input signal is input.

It is preferable that the minimum width W1 satisfy, for example, the following expression (1).

[Math. 2]

$$W1 \leq \frac{1}{2f_0\sqrt{\varepsilon_0\mu_0\varepsilon_{eff}\mu_{eff}}} \quad (1)$$

Here, in expression (1), $f_0$ is a maximum frequency of an input signal input to the first terminal T1 or the second terminal T2, $\varepsilon_0$ is a dielectric constant of a vacuum, $\mu_0$ is a permeability of a vacuum, $\varepsilon_{eff}$ is an effective dielectric constant of the first magnetic material 25 at the frequency $f_0$, and $\mu_{eff}$ is an effective permeability of the first magnetic material 25 at the frequency $f_0$ when a DC magnetic field is applied from the first magnet 31 to the first magnetic material 25.

Although the minimum width W1 between the second side S2 of the first absorber 26 and the first side S1 of the metal layer 10 has been described in detail here, it is preferable that a similar relationship be satisfied between the second side of the second absorber 28 and the first side S1 of the metal layer 10. That is, a minimum width between the second side of the second absorber 28 and the first side S1 of the metal layer 10 is preferably smaller than the width W2 between the first straight line L1 and the second straight line L2.

Also, when the first loss layer 21 and the second loss layer 22 are conductors, an insulating layer is provided between the first loss layer 21 and the metal layer 10 and between the second loss layer 22 and the metal layer 10. A known insulating layer may be used for the insulating layer.

The first magnet 31 and the second magnet 32 sandwich the metal layer 10, the first loss layer 21, and the second loss layer 22 in the z direction. The first magnet 31 and the metal layer 10 sandwich the first loss layer 21 in the z direction. The second magnet 32 and the metal layer 10 sandwich the second loss layer 22 in the z direction. The first magnet 31 and the second magnet 32 apply a DC magnetic field to the metal layer 10.

Figure 5:
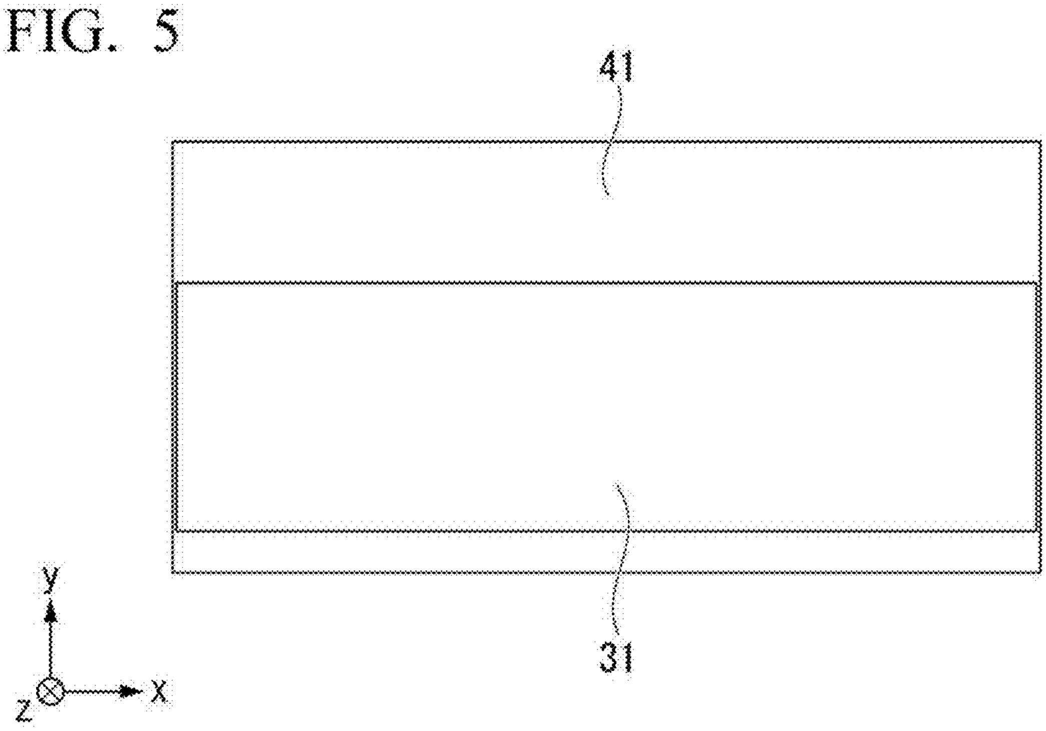
FIG. 5 A plan view of a conductor and a magnet of the non-reciprocal element board according to the first embodiment.

FIG. 5 is a plan view of the first magnet 31 and the first conductor 41 of the non-reciprocal circuit element 101 according to the first embodiment. The first magnet 31 and the second magnet 32 are at a position overlapping the first magnetic material 25 and the second magnetic material 27 when viewed from the z direction. The first magnet 31 and the second magnet 32 may overlap the first absorber 26 and the second absorber 28 when viewed from the z direction.

The first magnet 31 and the second magnet 32 are, for example, hard magnetic materials. The first magnet 31 and the second magnet 32 may be either insulators or conductors. The first magnet 31 and the second magnet 32 include any one selected from the group consisting of, for example, a ferrite magnet having insulating properties, a rare earth magnet having conductivity, TbFeCo, GdFeCo, SmFeCo, a [Co/Pt] multilayer film, and a [Co/Pd] multilayer film. If the first magnet 31 and the second magnet 32 are conductors, the first conductor 41 and the second conductor 42 may be omitted.

The first conductor 41 is sandwiched between the first magnet 31 and the first loss layer 21. The second conductor 42 is sandwiched between the second magnet 32 and the second loss layer 22. The first conductor 41 or the second conductor 42 is grounded to, for example, a reference potential. The reference potential is, for example, ground. The first conductor 41 and the second conductor 42 are not particularly limited as long as they have conductivity.

In the non-reciprocal circuit element 101 according to the present embodiment, since the minimum width W1 is smaller than the width W2, isolation characteristics are less likely to deteriorate even when a high-frequency input signal is input. In an edge-guided mode isolator, a high-frequency signal in a lowest-order mode propagates in a concentrated manner at an end portion of the metal layer 10, but a high-frequency signal in a first-order or higher-order mode is distributed in portions of the metal layer 10 other than the end portion. Therefore, a high-frequency signal in a higher-order mode is less likely to be absorbed compared to the high-frequency signal in the lowest-order mode. A high-frequency signal in a higher-order mode is generated when a width of the metal layer 10 in a direction orthogonal to a propagation direction of the high-frequency signal in the xy plane becomes approximately equal to half a wavelength of the electromagnetic wave. Therefore, when the minimum width W1 is adjusted, a cutoff frequency of a high-frequency signal in a higher-order mode can be higher, and deterioration of isolation characteristics caused by the high-frequency signal in the higher-order mode can be suppressed.

Although an example of the first embodiment has been described above, the present invention is not limited to these embodiments, and various modified examples are possible.

Figure 6:
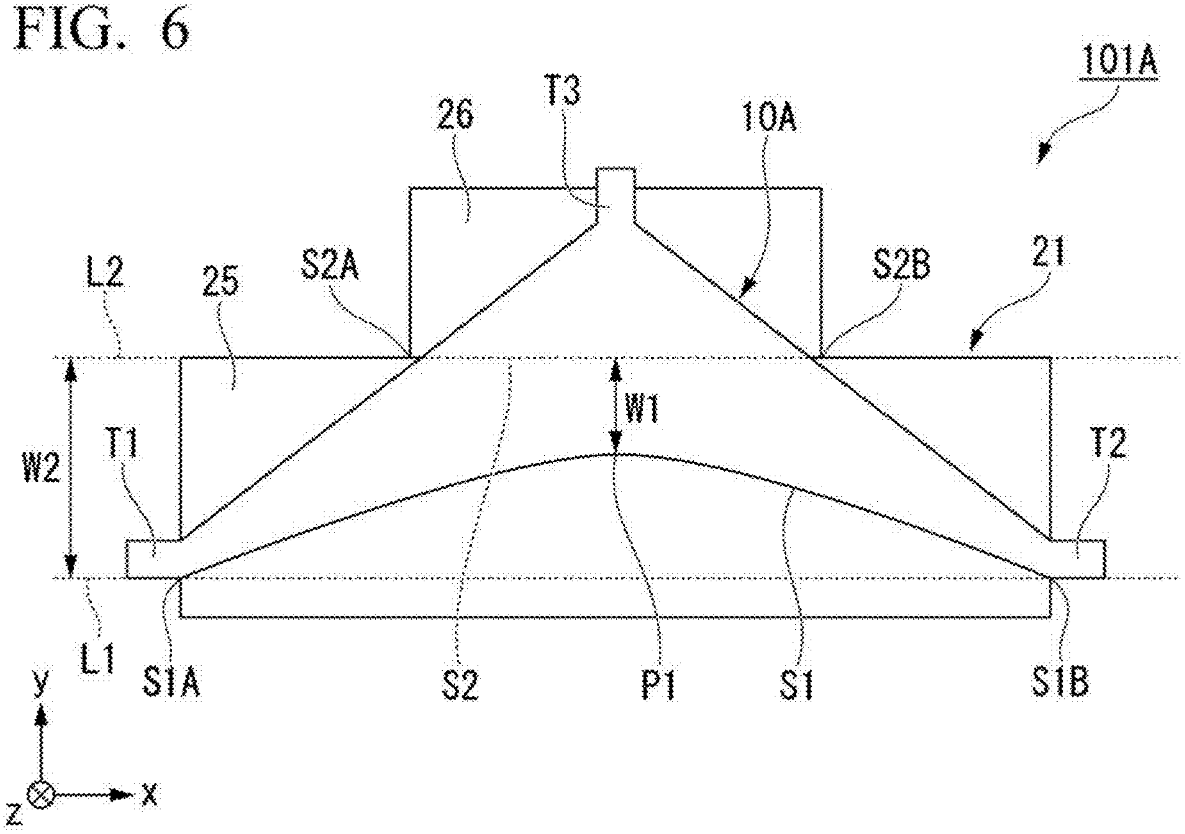
FIG. 6 A plan view of a metal layer and a loss layer of a non-reciprocal circuit element according to a first modified example.

FIG. 6 is a plan view of a non-reciprocal circuit element 101A according to a first modified example. The non-reciprocal circuit element 101A according to the first modified example differs from the non-reciprocal circuit element 101 in a shape of the metal layer 10 in a plan view from the z direction. In FIG. 6, components the same as those in the non-reciprocal circuit element 101 are denoted by the same reference signs and description thereof will be omitted.

A metal layer 10A has the first side S1 curved toward the third terminal T3 side from the first straight line L1. The first side S1 is curved toward the second straight line L2.

The non-reciprocal circuit element 101A according to the first modified example has the minimum width W1 smaller than the width W2, and therefore achieves the same effects as the non-reciprocal circuit element 100.

Figure 7:
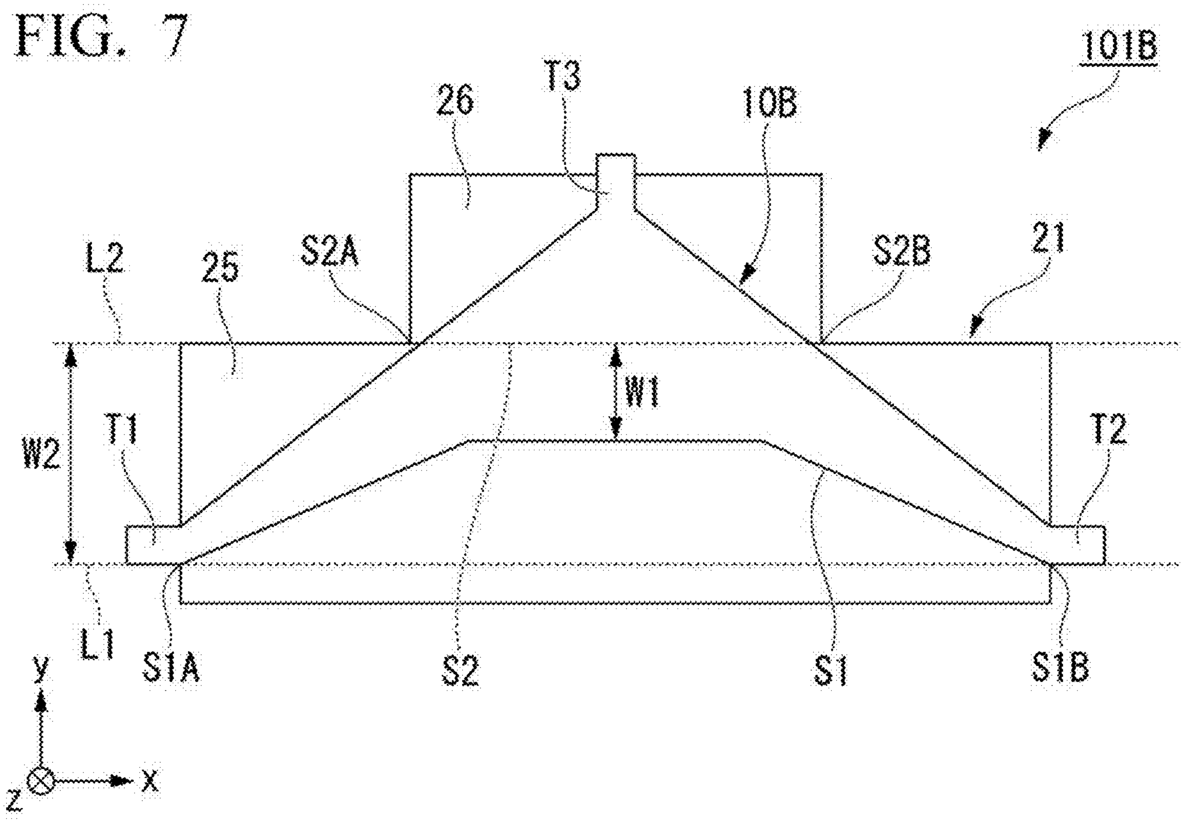
FIG. 7 A plan view of a metal layer and a loss layer of a non-reciprocal circuit element according to a second modified example.

FIG. 7 is a plan view of a non-reciprocal circuit element 101B according to a second modified example. The non-reciprocal circuit element 101B according to the second modified example differs from the non-reciprocal circuit element 101 in a shape of the metal layer 10 in a plan view from the z direction. In FIG. 7, components the same as those in the non-reciprocal circuit element 101 are denoted by the same reference signs and description thereof will be omitted.

A metal layer 10B has the first side S1 bent toward the third terminal T3 side from the first straight line L1. The first side S1 of the metal layer 10B is bent toward the second straight line L2. The first side S1 of the metal layer 10B is bent a plurality of times.

The non-reciprocal circuit element 101B according to the second modified example has the minimum width W1 smaller than the width W2, and therefore achieves the same effects as the non-reciprocal circuit element 100.

Figure 8:
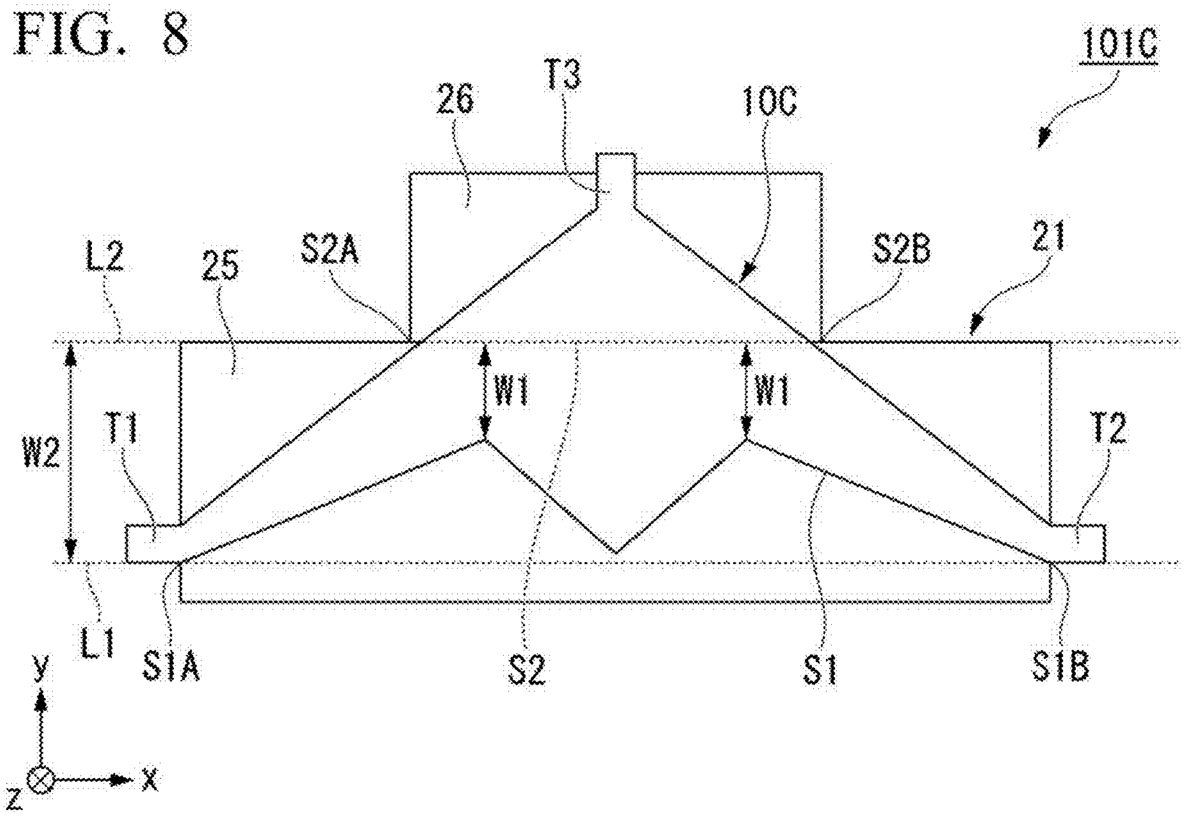
FIG. 8 A plan view of a metal layer and a loss layer of a non-reciprocal circuit element according to a third modified example.

FIG. 8 is a plan view of a non-reciprocal circuit element 101C according to a third modified example. The non-reciprocal circuit element 101C according to the third modified example differs from the non-reciprocal circuit element 101 in a shape of the metal layer 10 in a plan view from the z direction. In FIG. 8, components the same as those in the non-reciprocal circuit element 101 are denoted by the same reference signs and description thereof will be omitted.

A metal layer 10C has the first side S1 curved toward the third terminal T3 side from the first straight line L1. The first side S1 of the metal layer 10C is bent toward the second straight line L2. The first side S1 of the metal layer 10C is bent a plurality of times. In a distance between the first side S1 and the second side S2, the minimum width W1 may be at a plurality of locations.

The non-reciprocal circuit element 101C according to the third modified example has the minimum width W1 smaller than the width W2, and therefore achieves the same effects as the non-reciprocal circuit element 100.

Figure 9:
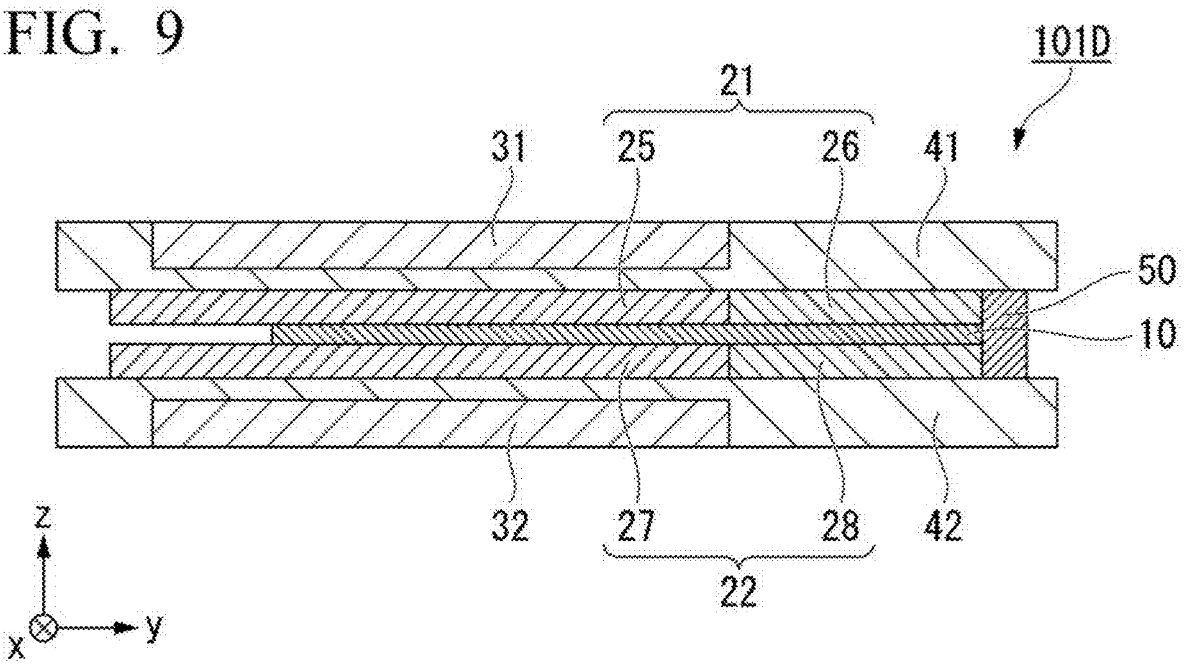
FIG. 9 A cross-sectional view of a non-reciprocal circuit element according to a fourth modified example.

FIG. 9 is a cross-sectional view of a non-reciprocal circuit element 101D according to a fourth modified example. The non-reciprocal circuit element 101C according to the fourth modified example differs from the non-reciprocal circuit element 101 in that it includes a resistor 50. In FIG. 9, components the same as those in the non-reciprocal circuit element 101 are denoted by the same reference signs and description thereof will be omitted.

In the non-reciprocal circuit element 101, the third terminal T3 has been an open end, but the third terminal T3 may be connected to the resistor 50 as illustrated in FIG. 9. When the resistor 50 is provided, absorption characteristics of a high-frequency signal at the third terminal T3 can be further improved. Also, a ground conductor may be provided instead of the resistor 50. The ground conductor electrically connects the first conductor 41, the metal layer 10, and the second conductor 42, and grounds the metal layer 10.

The non-reciprocal circuit element 101D according to the fourth modified example has the minimum width W1 smaller than the width W2, and therefore achieves the same effects as the non-reciprocal circuit element 100.

Second Embodiment

Figure 10:
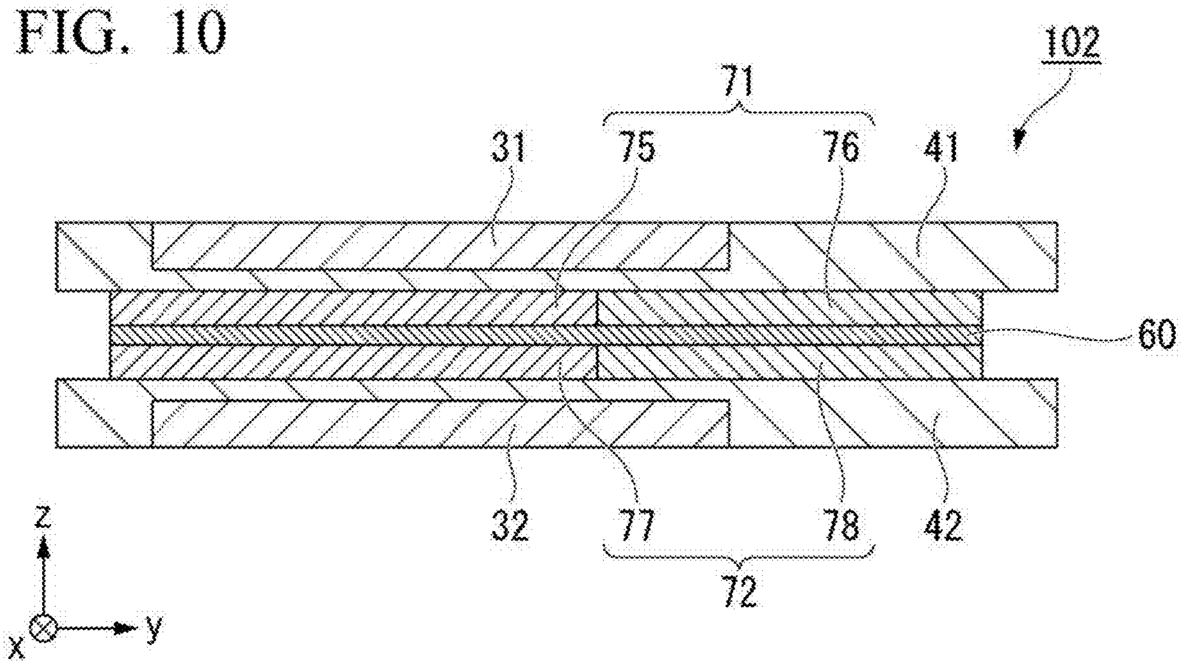
FIG. 10 A cross-sectional view of a non-reciprocal circuit element according to a second embodiment.

FIG. 10 is a cross-sectional view of a non-reciprocal circuit element 102 according to a second embodiment. The non-reciprocal circuit element 102 includes, for example, a metal layer 60, a first loss layer 71, a second loss layer 72, a first magnet 31, a second magnet 32, a first conductor 41, and a second conductor 42. The non-reciprocal circuit element 102 functions as, for example, an isolator. The first magnet 31, the second magnet 32, the first conductor 41, and the second conductor 42 are similar to those of the non-reciprocal circuit element 101 according to the first embodiment.

Figure 11:
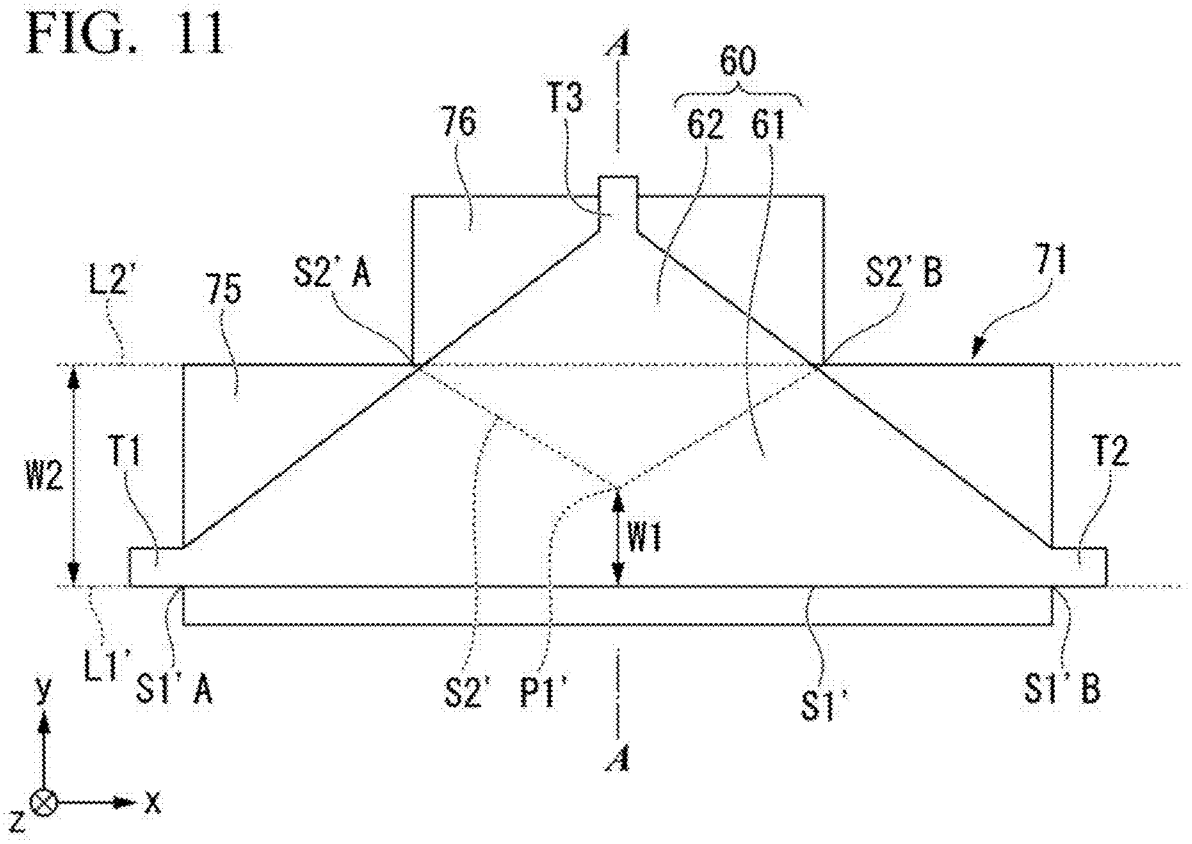
FIG. 11 A plan view of a metal layer and a loss layer of the non-reciprocal circuit element according to the second embodiment.
Figure 12:
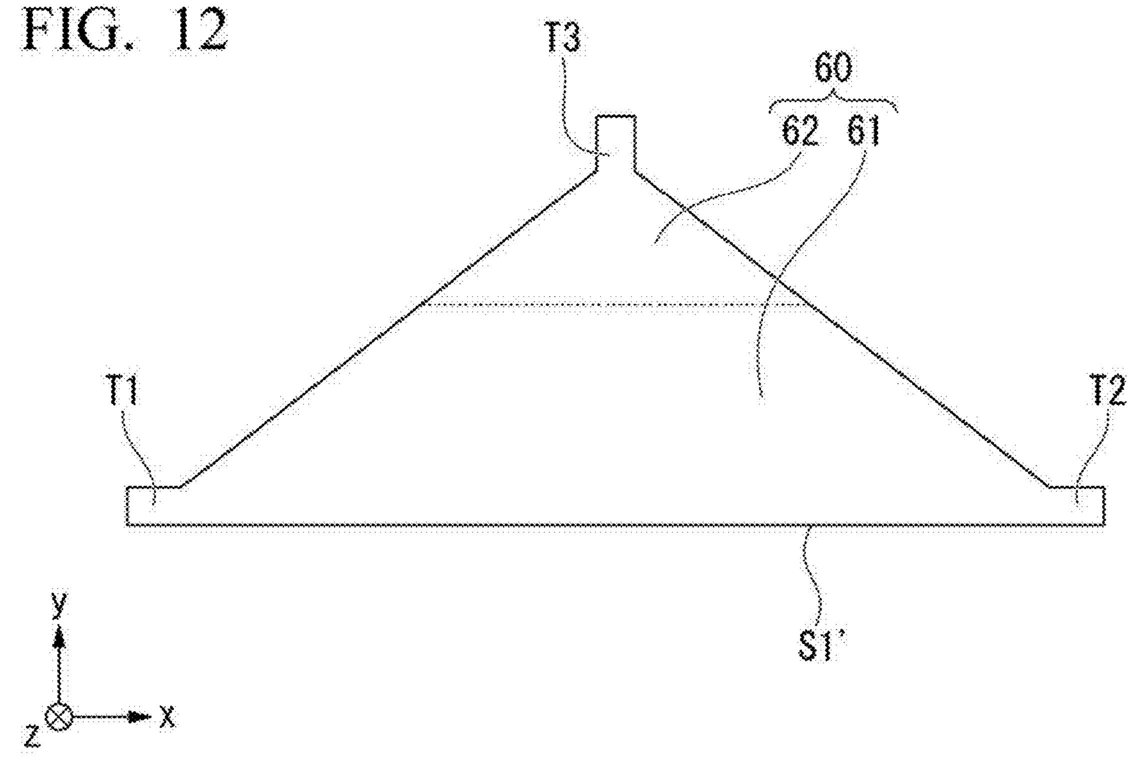
FIG. 12 A plan view of the metal layer of the non-reciprocal circuit element according to the second embodiment.
Figure 13:
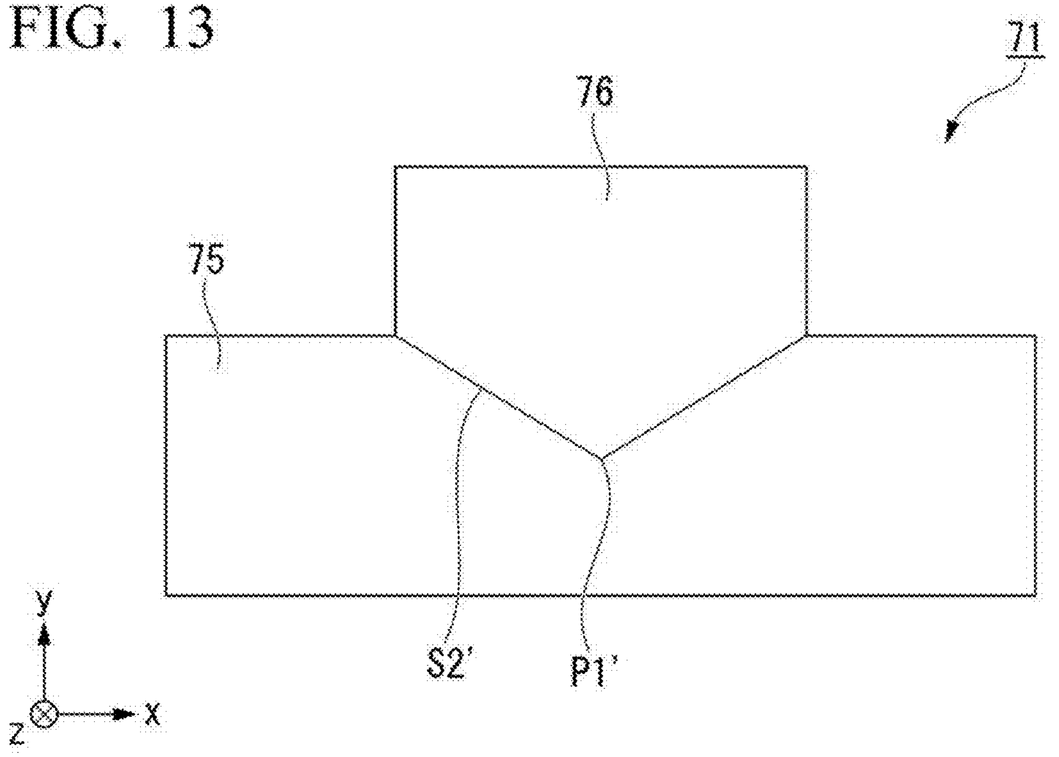
FIG. 13 A plan view of the loss layer of the non-reciprocal circuit element according to the second embodiment.

FIG. 11 is a plan view of the metal layer 60 and the first loss layer 71 of the non-reciprocal circuit element 102 according to the second embodiment. FIG. 10 is a cross section taken along line A-A of FIG. 11. FIG. 12 is a plan view of the metal layer 60 of the non-reciprocal circuit element 102 according to the second embodiment. FIG. 13 is a plan view of the first loss layer 71 of the non-reciprocal circuit element 102 according to the second embodiment.

A configuration of the metal layer 60 is similar to that of the metal layer 10. The metal layer 60 is formed of the same material as the metal layer 10. The metal layer 60 has a first terminal T1, a second terminal T2, and a third terminal T3. The metal layer 60 has a first region 61 and a second region 62. The first region 61 extends across the first terminal T1 and the second terminal T2. The first region 61 overlaps a first magnetic material 75 in the z direction. The second region 62 extends between the first terminal T1 and the third terminal T3 and between the second terminal T2 and the third terminal T3. The second region 62 overlaps a first absorber 76 in the z direction.

A first side S1' of the metal layer 60 connecting the first terminal T1 and the second terminal T2 is a straight line and is not bent. The first side S1' is a straight line extending along a first straight line L1'. The first straight line L1' is a straight line connecting a first end S1'A and a second end S1'B of the first side S1'.

The first loss layer 71 and the second loss layer 72 sandwich the metal layer 60 in the z direction. The first loss layer 71 includes the first magnetic material 75 and the first absorber 76. The second loss layer 72 includes a second magnetic material 77 and a second absorber 78. The first loss layer 71 and the second loss layer 72 have substantially the same shape. The first loss layer 71 is similar in material and configuration to the first loss layer 21, except for the shape of the second side S2. The second loss layer 72 is similar in material and configuration to the second loss layer 22 except for the shape of the second side S2.

A second side S2' of the first absorber 76 is bent toward the first terminal T1 and the second terminal T2 from a second straight line L2'. The second side S2' is bent toward the first straight line L1'. The second straight line L2' is a straight line connecting a first end S2'A and a second end S2'B of the second side S2'.

A width between the first side S1' and the second side S2' becomes a minimum width W1, for example, at a midpoint P1' of the second side S2'. The midpoint P1' is a center of the second side S2' in the x direction. Here, an example in which the minimum width W1 is at the midpoint P1' is illustrated, but the minimum width W1 may be at a position other than the midpoint P1'.

The minimum width W1 is smaller than a width W2 between the first straight line L1' and the second straight line L2. If the minimum width W1 is smaller than the width W2, a cutoff frequency shifts to a higher frequency side, and isolation characteristics are less likely to deteriorate even when a high-frequency input signal is input. It is preferable that the minimum width W1 satisfy, for example, the above-described expression (1).

Although the minimum width W1 between the second side S2' of the first absorber 76 and the first side S1' of the metal layer 60 has been described in detail here, it is preferable that a similar relationship be satisfied between the second side of the second absorber 78 and the first side S1' of the metal layer 60.

In the non-reciprocal circuit element 102 according to the present embodiment, since the minimum width W1 is smaller than the width W2, isolation characteristics are less likely to deteriorate even when a high-frequency input signal is input.

Although an example of the second embodiment has been described above, the present invention is not limited to these embodiments, and various modified examples are possible.

Figure 14:
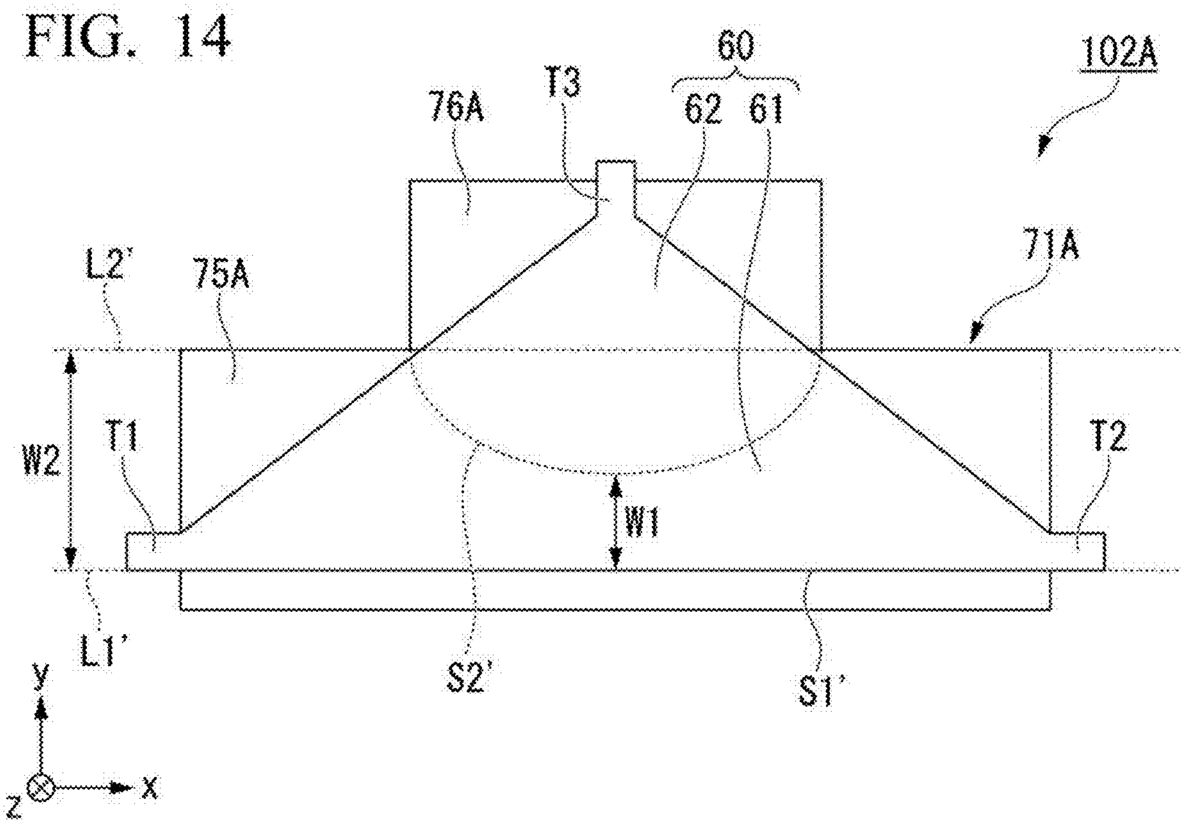
FIG. 14 A plan view of a metal layer and a loss layer of a non-reciprocal circuit element according to a fifth modified example.
Figure 15:
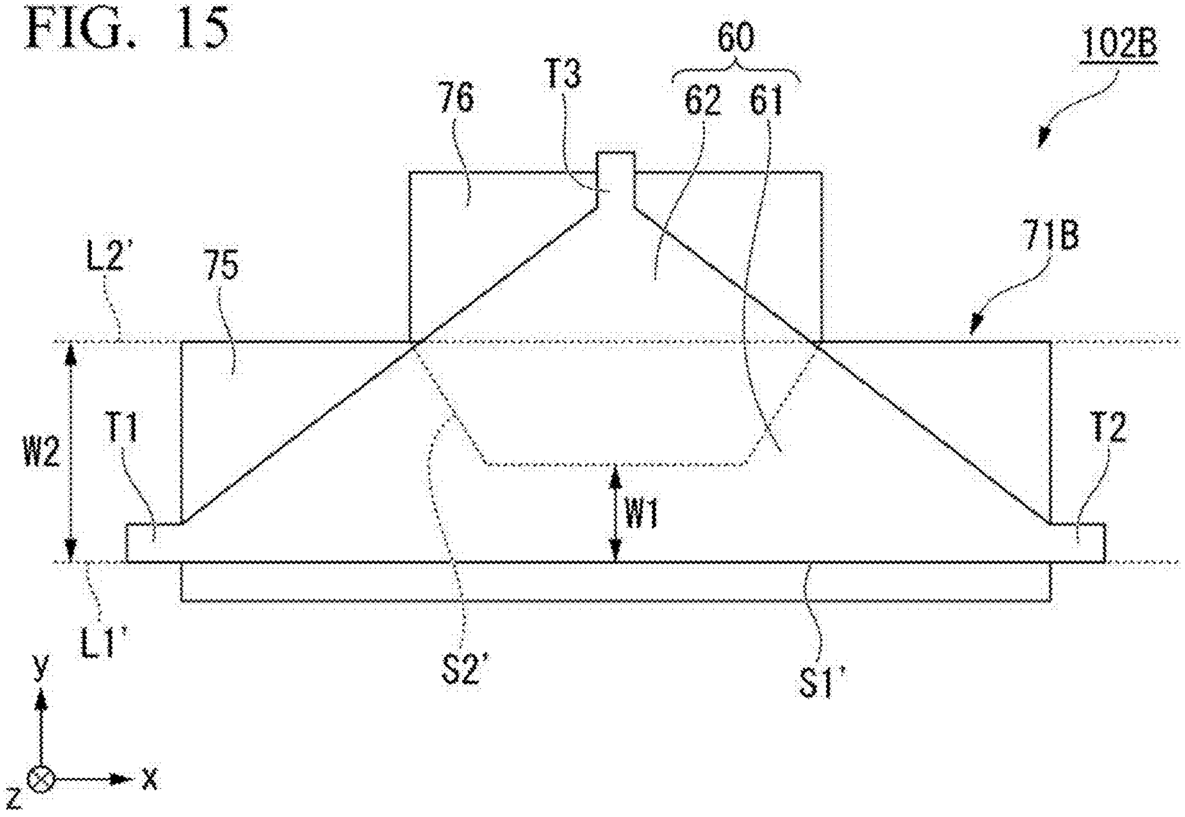
FIG. 15 A plan view of a metal layer and a loss layer of a non-reciprocal circuit element according to a sixth modified example.
Figure 16:
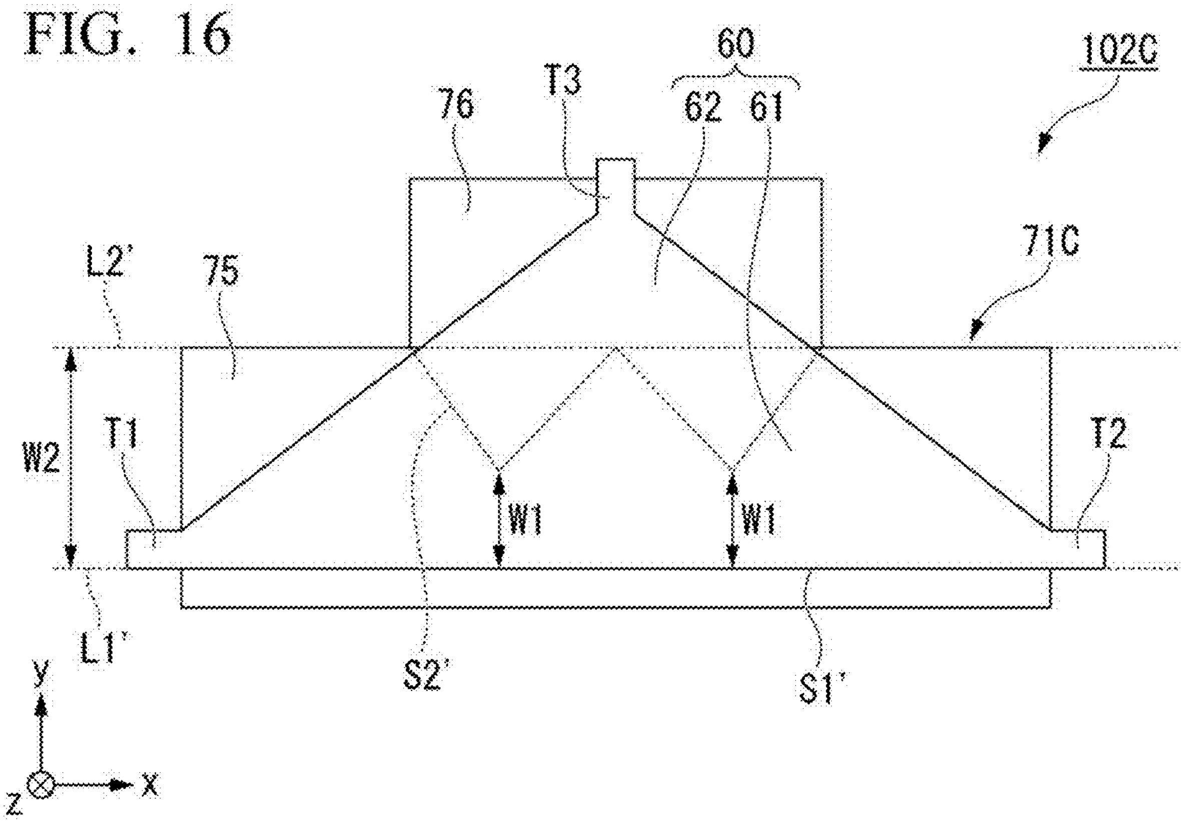
FIG. 16 A plan view of a metal layer and a loss layer of a non-reciprocal circuit element according to a seventh modified example.

FIG. 14 is a plan view of a non-reciprocal circuit element 102A according to a fifth modified example. FIG. 15 is a plan view of a non-reciprocal circuit element 102B according to a sixth modified example. FIG. 16 is a plan view of a non-reciprocal circuit element 102C according to a seventh modified example.

Similarly to the shape of the first side S1 in the first to third modified examples of the first embodiment, a shape of the second side S2' in the second embodiment is also arbitrary. For example, as illustrated in FIG. 14, the second side S2' may be curved toward the first straight line L1'. As illustrated in FIGS. 15 and 16, the second side S2' may be bent a plurality of times toward the first straight line L1'. Also, in a distance between the first side S1' and the second side S2', the minimum width W1 may be at a plurality of locations as illustrated in FIG. 16.

Each of the non-reciprocal circuit elements 102A, 102B, and 102C according to the fifth to seventh modified examples has the minimum width W1 smaller than the width W2, and therefore achieves the same effects as the non-reciprocal circuit element 100.

Also in the second embodiment and the modified example, the third terminal T3 may be an open end, may be connected to a resistor, or may be connected to a ground conductor.

Third Embodiment

Figure 17:
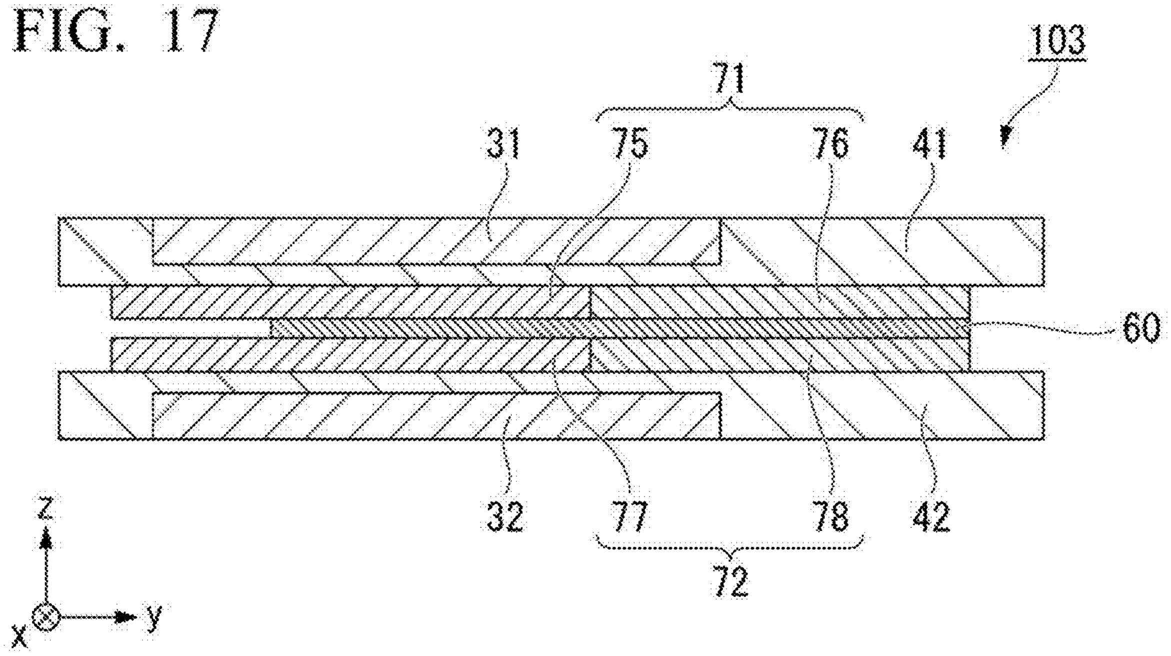
FIG. 17 A cross-sectional view of a non-reciprocal circuit element according to a third embodiment.
Figure 18:
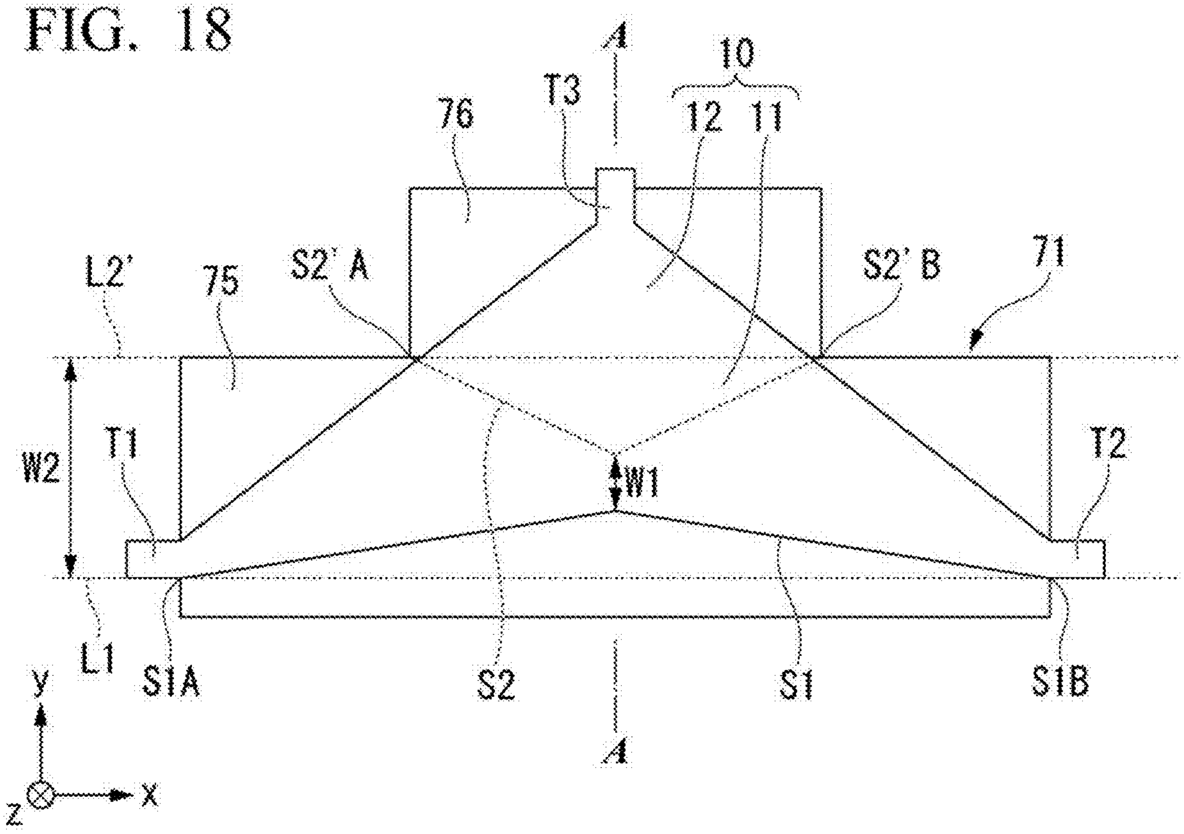
FIG. 18 A plan view of a metal layer and a loss layer of the nonreciprocal circuit element according to the third embodiment.

FIG. 17 is a cross-sectional view of a non-reciprocal circuit element 103 according to a third embodiment. FIG. 18 is a plan view of the non-reciprocal circuit element 103 according to the third embodiment.

The non-reciprocal circuit element 103 includes, for example, a metal layer 10, a first loss layer 71, a second loss layer 72, a first magnet 31, a second magnet 32, a first conductor 41, and a second conductor 42. The non-reciprocal circuit element 103 functions as, for example, an isolator. In the third embodiment, components the same as those in the first and second embodiments are denoted by the same reference signs and description thereof will be omitted.

The non-reciprocal circuit element 103 according to the third embodiment is a combination of the metal layer 10 according to the first embodiment, and the first loss layer 71 and the second loss layer 72 according to the second embodiment.

A first side S1 of the metal layer 10 is bent toward a third terminal T3 side from a first straight line L1. The first side S1 is bent toward a second straight line L2'. A second side S2' of a first absorber 76 is bent toward a side of a first terminal T1 and a second terminal T2 from the second straight line L2. The second side S2' is bent toward the first straight line L1.

A minimum width W1 is smaller than a width W2 between the first straight line L1 and the second straight line L2'. If the minimum width W1 is smaller than the width W2, a cutoff frequency shifts to a higher frequency side, and isolation characteristics are less likely to deteriorate even when a high-frequency input signal is input. It is preferable that the minimum width W1 satisfy, for example, the above-described expression (1).

In the non-reciprocal circuit element 103 according to the present embodiment, since the minimum width W1 is smaller than the width W2, isolation characteristics are less likely to deteriorate even when a high-frequency input signal is input. Also, the non-reciprocal circuit element 103 may be a combination of the modified examples of the first embodiment and the second embodiment.

EXAMPLES

Example 1

In example 1, a non-reciprocal circuit element having the same configuration as an example of the first embodiment (FIG. 6) was fabricated. The first side S1 of the metal layer 10 was made to curve toward the third terminal T3 side from the first straight line L. The second sides S2 of the first absorber 26 and the second absorber 28 were made to be straight lines, A width between the first side S1 and the second side S2 was configured to have, for example, the minimum width W1 at the midpoint P1 of the first side S1, and the minimum width W1 was made smaller than the width W2 between the first straight line L1 and the second straight line L2. Isolation characteristics of the non-reciprocal circuit element of example 1 with respect to frequencies were obtained by a simulation.

Example 2

In example 2, a non-reciprocal circuit element having the same configuration as an example of the second embodiment (FIG. 14) was fabricated. The first side S1' of the metal layer 60 was made to be a straight line extending along the first straight line L1'. The second sides S2' of the first absorber 76 and the second absorber 78 were made to curve toward the first straight line L1'. A width between the first side SP and the second side S2' was configured to have, for example, the minimum width W1 at the midpoint P1' of the second side S2', and the minimum width W1 was made smaller than the width W2 between the first straight line L1' and the second straight line L2'. Isolation characteristics of the non-reciprocal circuit element of example 2 with respect to frequencies were obtained by a simulation.

Comparative Example 1

A non-reciprocal circuit element of comparative example 1 differs from example 1 in that the first side S1 of the metal layer 10 is a straight line extending along the first straight line L1, and differs from example 2 in that the second sides S2' of the first absorber 76 and the second absorber 78 are straight lines extending along the second straight line L2'. The first side S1 and the second side S2 are parallel to each other, and a width between the first side S1 and the second side S2 is constant. That is, the width W2 between the first side S1 and the second side S2 is equal to the minimum width W1. Isolation characteristics of the non-reciprocal circuit element of comparative example 1 with respect to frequencies were obtained by a simulation.

Figure 19:
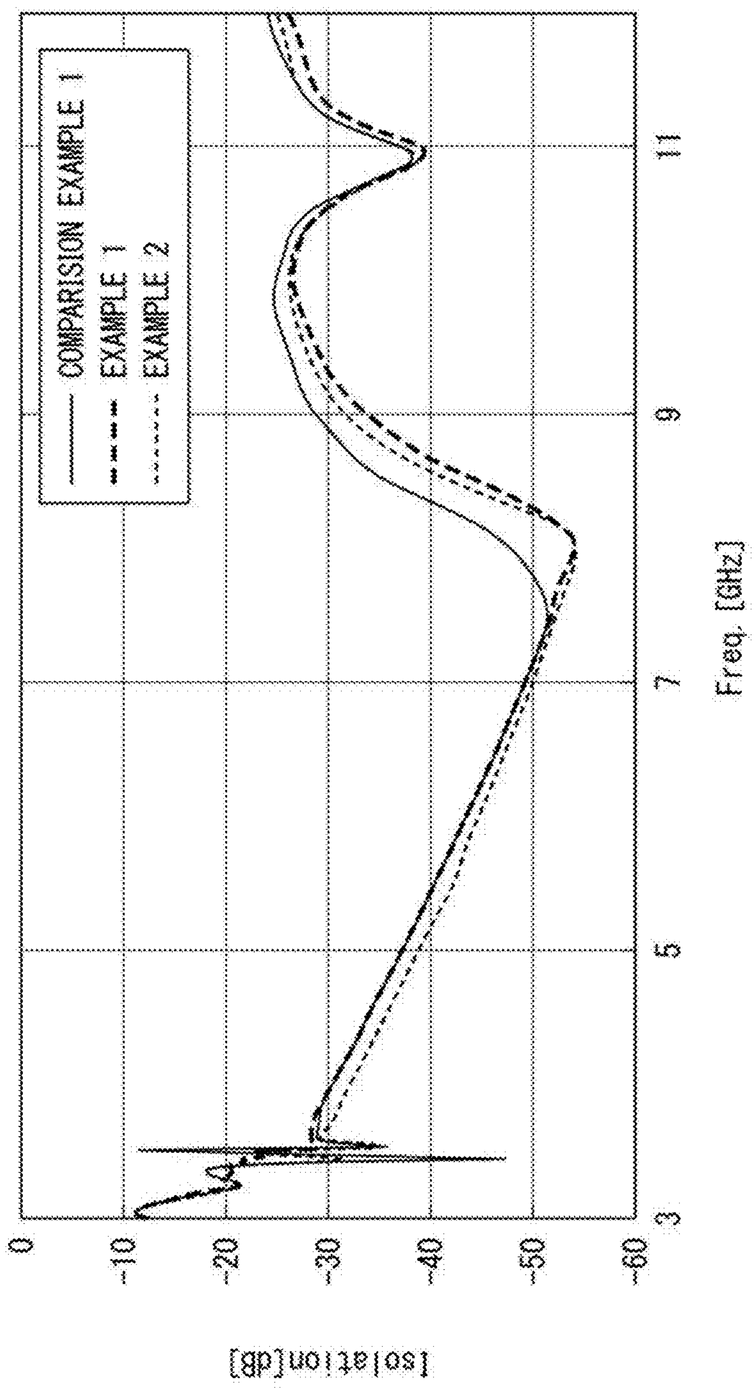
FIG. 19 Measurement results of isolation characteristics of the non-reciprocal circuit elements according to example 1, example 2, and comparative example 1.

FIG. 19 shows measurement results of the isolation characteristics of the non-reciprocal circuit elements according to example 1, example 2, and comparative example 1. The horizontal axis of FIG. 19 represents a frequency of a high-frequency signal input to the first terminal T1, and the vertical axis represents isolation characteristics. As shown in FIG. 19, in comparative example 1, the isolation characteristics begin to deteriorate at frequencies of 7.5 GHz or higher. In contrast, in examples 1 and 2, the isolation characteristics did not begin to deteriorate until the vicinity of 8.0 GHz. That is, a point at which the isolation characteristics begin to deteriorate has shifted to a higher frequency side. Compared to comparative example 1, the isolation characteristics are less likely to deteriorate in examples 1 and 2 even when a high-frequency input signal is input.

REFERENCE SIGNS LIST

10, 10A, 10B, 10C Metal layer
11, 61 First region
12, 62 Second region
21, 71 First loss layer
22, 72 Second loss layer
25, 75 First magnetic material
26, 76 First absorber
27, 77 Second magnetic material
28, 78 Second absorber
31 First magnet
32 Second magnet
41 First conductor
42 Second conductor
50 Resistor
60 Metal layer
100, 101, 10A, 101B, 101C, 101D, 102, 102A, 102B, 102C, 103 Non-reciprocal circuit element
L1, L1' First straight line
L2, L2' Second straight line
P1, P1' Midpoint
S1, S1' First side
S2, S2 Second side
T1 First terminal
T2 Second terminal
T3 Third terminal
W1 Minimum width
W2 Width

The invention claimed is:

1. A non-reciprocal circuit element comprising a metal layer, a loss layer, and a magnet, wherein
  - the metal layer includes a first terminal, a second terminal, and a third terminal,
  - the loss layer includes a magnetic material and an absorber,
  - the magnetic material overlaps a first region of the metal layer in a thickness direction,
  - the absorber overlaps a second region of the metal layer in the thickness direction,
  - the first region extends across the first terminal and the second terminal,
  - the second region extends between the first terminal and the third terminal and between the second terminal and the third terminal,
  - the magnet and the metal layer sandwich at least the magnetic material in the thickness direction, and
  - when viewed from the thickness direction, a minimum width, defined as a shortest distance between (i) a first side of the metal layer connecting the first terminal and the second terminal and (ii) a second side of the absorber, the second side being one of sides of the absorber that is closer to the first terminal and the second terminal than the other sides of the absorber are, is smaller than a width between a first straight line connecting both ends of the first side of the metal layer and a second straight line connecting both ends of the second side of the absorber.

2. The non-reciprocal circuit element according to claim 1, wherein the minimum width between the first side of the metal layer and the second side of the absorber is provided at a midpoint of the first side.

3. The non-reciprocal circuit element according to claim 1, wherein the first side of the metal layer is bent or curved toward the second straight line.

4. The non-reciprocal circuit element according to claim 1, wherein the second side of the absorber is bent or curved toward the first straight line.

5. The non-reciprocal circuit element according to claim 1, wherein the first side of the metal layer is bent or curved toward the second straight line, and the second side of the absorber is bent or curved toward the first straight line.

6. The non-reciprocal circuit element according to claim 1, wherein the minimum width satisfies the following expression (1),

[Math. 1]

$$W1 \leq \frac{1}{2f_0\sqrt{\varepsilon_0\mu_0\varepsilon_{eff}\mu_{eff}}} \tag{1}$$

in expression (1), W1 is the minimum width, $f_0$ is a maximum frequency of an input signal input to the first terminal or the second terminal, $\varepsilon_0$ is a dielectric constant of a vacuum, $\mu_0$ is a permeability of a vacuum, $\varepsilon_{eff}$ is an effective dielectric constant of the magnetic material at the frequency $f_0$, and $\mu_{eff}$ is an effective permeability of the magnetic material at the frequency $f_0$ when a DC magnetic field is applied from the magnet to the magnetic material.

7. The non-reciprocal circuit element according to claim 1, wherein the third terminal is grounded directly or via a resistor.

8. The non-reciprocal circuit element according to claim 1, wherein the second side of the absorber is straight.

9. The non-reciprocal circuit element according to claim 1, wherein the minimum width between the first side and the second side is provided at two or more points of the first side.

* * * * *